United States Patent [19]
Holter et al.

[11] 4,255,195
[45] Mar. 10, 1981

[54] COMPOSITIONS CONTAINING SILICON DIOXIDE

[76] Inventors: Heinz Holter, 39-41 Beisenstrasse, Gladbeck; Heinz Gresch, 89 Dornenstrasse, Dortmund-Derne; Heinrich Igelbuscher, 60 Maroq-en-Baroeul-Strasse, Gladbeck, all of Fed. Rep. of Germany

[21] Appl. No.: 24,045

[22] Filed: Mar. 26, 1979

Related U.S. Application Data

[63] Continuation of Ser. No. 721,469, Sep. 8, 1976, abandoned.

[51] Int. Cl.² ................................................. C09K 3/28
[52] U.S. Cl. .................................. 106/18.12; 106/68; 106/69; 106/98; 106/104
[58] Field of Search ................... 252/62; 106/98, 109, 106/281 R, 18.12, 68, 69, 104; 264/DIG. 17

[56] References Cited

U.S. PATENT DOCUMENTS

| | | | |
|---|---|---|---|
| 1,861,317 | 5/1932 | Moross | 106/98 |
| 2,410,954 | 11/1946 | Sharp | 106/98 |
| 2,511,724 | 6/1950 | Lobaugh | 106/98 |
| 3,075,848 | 1/1963 | Davies et al. | 106/84 |
| 3,131,075 | 4/1964 | Brooks | 106/98 |
| 3,467,535 | 9/1969 | Myles | 252/62 |
| 3,681,113 | 8/1972 | Yoldas | 106/38.3 |

*Primary Examiner*—Lorenzo B. Hayes
*Attorney, Agent, or Firm*—Berman, Aisenberg & Platt

[57] ABSTRACT

The present invention relates to the use of amorphous, dust-like silicon dioxide emission products from electrothermic manufacture of ferrosilicon and/or silicon as fillers in refractory compositions. The advantages obtained from the use of the products include improvement in mechanical abrasion resistance, heat stability, and electrical, thermal and sound insulation.

9 Claims, No Drawings

COMPOSITIONS CONTAINING SILICON DIOXIDE

RELATED APPLICATION

This application is a continuation of application Ser. No. 721,469, filed Sept. 8th, 1976 now abandoned, the entire disclosure of which is incorporated herein by reference.

BACKGROUND OF THE INVENTION

Filler materials are added to certain other materials, in particular building materials, in order to obtain or improve the following characteristics, namely: the mechanical abrasion strength and/or heat-resistance, and particularly fire-resistance and/or resistance to temperature changes, and/or thermal insulation and/or sound insulation and/or the electrical insulation properties and/or the workability of masses, mixtures or compositions, particularly building compositions, and/or paints and the like. For the purpose of improving the above-listed properties, it is customary to use, e.g., asbestos fibre, mineral wool, glass wool, pearlites, vermiculties, fragmented pumice stone, refractory clay, powdered refractory clay, slag-sand, quartz sand, sintered corundum, sintered dolomite, alumina, powdered dolomite, gypsum, sawdust, powdered cork and other materials. However, these materials fulfill the above-listed requirements only in part, or only imperfectly, or they raise problems in the production or processability of the materials. In addition, some of these materials are expensive or scarce, and others, such as asbestos, present considerable health risks which make their use undesirable.

On the other hand, various chemical-technical processes and production methods produce dust-like or powdered by-products which are not returnable into the processing cycle and for which no useful purpose was previously found. The disposal of such by-products may cause considerable expense because they must be deposited at authorized dumping grounds. This applies especially to dust-fine particles from emissions occuring in the production of silicon or ferrosilicon which, because of their low density and correspondingly-large volume, take up much space. In addition, such materials, have to be carefully piled up or comglomerated into larger and more manageable lumps by expensive processing.

SUMMARY OF THE INVENTION

This invention provides a method of improving the mechanical abrasion resistance and/or heat stability, particularly fire resistance, and/or resistance to temperature changes, and/or thermal insulation and/or sound insulation, and/or the electrical insulation properties, and/or the workability of masses, mixtures and compositions, particularly building mixtures and/or paint compositions or the like, wherein a material comprising predominantly-amorphous, dust-like silicon dioxide is used in the production of an article as an ingredient thereof or is applied to an article subsequent to the manufacture thereof.

This invention also provides a method of improving the mechanical abrasion resistance and/or heat stability particularly fire resistance, and/or resistance to temperature changes, and/or thermal insulation and/or sound insulation, and/or the electrical insulation properties, and/or the workability of masses, mixtures and compositions, particularly building mixtures and/or paint compositions or the like, wherein a material comprising the dust emission products produced in the electro-thermic manufacture of ferro-silicon and/or silicon, which products predominantly comprise amorphous silicon dioxide is used in the production of an article as an ingredient thereof or is applied to an article subsequent to the manufacture thereof.

This invention also provides a method of solving problems associated with the disposal of dust emitted in the electro-thermic manufacture of ferro-silicon, involving the use of the dust (I) as a filling material in the manufacture of one or more of the following products:

(a) bricks, such as of concrete or refractory material;
(b) building panels, such as of chipboard;
(c) building slabs, such as of concrete;
(d) fire-retarding panels;
(e) sound-proofing panels;
(f) plastic-moulded panels;
(g) corrosion-resistant panels;
(h) refractory material;
(i) heat insulating material;
(j) electrical insulating material;
(k) sound insulating material;
(l) plastic material;

or (II) as an additive to a paint or sprayable mixture which may be applied as a coating to one or more of (a) to (g).

This invention also provides a method of dealing with dust emitted in the electro-thermic manufacture of ferro-silicon and/or silicon, involving the use of the dust as a filling material.

This invention also provides a filler material comprising amorphous, dust-like silicon dioxide.

DESCRIPTION OF THE INVENTION

Filler material is conveniently obtained as a by-product from electro-thermic production of ferro-silicon and/or silicon, such as an electro-thermic process operating within a temperature range of from 1500° to 3000° C. The basic constituent of this substance is a fine, dust-like X-ray amorphous $SiO_2$ (approximately 82 to 95%), at least some of which may have been produced by direct sublimation from the vapour to the solid phase, with a small amount of crystalline quartz (approximately 5 to 18%). X-ray examination reveals, that, with the exception of the comparatively small quartz content, this dust or powder may be classified as being X-ray amorphous. In addition, the filler material may contain small amounts of oxides of iron and/or of calcium and of magnesium, and carbon. The bulk weight is approximately 0.25 to 0.5 g/ml and grain size distribution is such that (for 95% of the material) the grain size is below 50μ.

The filler material according to this invention is inexpensive and available in adequate amounts. It surprisingly possesses properties which may be utilized for a wide range of purposes and, in particular, contributes substantially to an improvement of mechanical abrasion strength and/or heat resistance, particularly fire-resistance and/or resistance to temperature changes, and/or thermal insulation and/or sound insulation and/or the electrical insulation properties and/or the workability of masses, compositions or mixtures, in particular building mixtures and/or paints or the like.

In particular, the filler material according to this invention is well suited for use as or in a fire-inhibiting or fire-resistant material or mass, in particular a mixture or composition capable of being sprayed or tamped down for building purposes and comprising a binding agent, a fire-inhibiting agent and, possibly, further filler substances.

Fire-inhibiting or refractory materials which, according to current custom and knowledge in the art, consist of a mixture of cement and asbestos fibres are, for example, sprayed on steel girders to protect them against the action of fire. Whilst these conventional refractory materials certainly ensure the required fire protection, they are nevertheless very expensive.

Thus, according to this invention, a refractory material incorporating the proposed filler material may be used instead, and better fire protection may be obtained in a less expensive manner. Such a material has a high thermal insulation value which is, at least partly, due to the low density and the large volume of the filler material; over and above this it also has great resistance to mechanical abrasion.

It is possible to improve the properties of the refractory material, and particularly the thermal insulation value thereof, by utilizing in the preparation of the material, glass- or mineral-wool waste. Such materials are conveniently obtained from by-products or waste materials produced in the manufacture of insulation matting.

It is also possible to improve the adhesion properties and the strength/density ratio by utilizing, in the preparation of the material, wetting and/or flocculating agents and/or materials of a similar kind.

Since the dust-like products emitted in the electro-thermic manufacture of ferro-silicon are present in oxide form, chemical and physical reactions with other components of the refractory material are considerably enhanced and shrinkage, with resulting crack formation under heat, is minimized, the filler material having the effect of improving the thermal characteristics of the mass with increasing temperature exposure.

It is also possible to include further additives, such as calcium sulphate (advantageously in the form of waste products occurring in the desulphurization of flue or smoke gases and containing predominantly or exclusively $CaSO_4$), with fire-inhibiting properties in the mixture or mass.

The filler material (according to this invention) may be used in the preparation of a sprayable or a tampable mass for use in the building industry generally, particularly in pre-stressed concrete buildings, for insulating and protecting steel girders. Such material may also be used in, e.g., steelworks, coke-ovens and foundries.

A refractory material according to this invention was experimentally tested. For this purpose a sectional steel girder (profile HEB 220) 3.600 mm long (with foot plates welded to top and bottom thereof) was subjected to a load of 133 t after a protective layer (of a fire-proofing material consisting of mineral wool, portland cement and filler material according to the invention in a layer was 23 mm thick) had been applied to the girder, and the girder was then exposed, over a length of 3.100 mm, to temperature rising from 8° C. to approximately 980° C. in the course of 1.5 hours. The girder showed no reduction in its load bearing capacity. The protective layer shrank in the course of the testing time to an average thickness of 16 mm.

Comparative tests were carried out with commercially available conventional asbestos-bearing spray-materials. For achieving fire protection corresponding to class F 90, it was necessary to use 10 kg/m$^2$ of the conventional material containing asbestos, but only 7 kg/m$^2$ were required with the same result of the material according to this invention. The material according to this invention contained approximately 60% mineral wool, 20% cement, and 20% of the filler material. The mixture was prepared with 25 kg dry substance for 15 l. of water, wherein were contained 75 ml of Lensodel, a tenside on the basis of ethyleneoxide condensates. The layer thickness required to meet the demands of fire protection class F 90 for a material containing approximately 60% mineral wool, 20% pearlite and 20% cement was approximately 60 mm. With the material according to this invention and of the above specified composition only approximately 5 mm layer-thickness was needed, and only because such thin layers cannot be very evenly applied will it be necessary in actual practice to apply a layer thickness of approximately 15 mm. The above mentioned composition of the material may be varied within very wide limits depending on mechanical and thermal demands, and it is also possible to add further conventional materials to the mixture, such as, e.g., perlites which have good heat insulation properties.

Another field of application for the filler material according to this invention is the manufacture of building panels. It is common practice to produce ceiling panels, partition walls, doors, etc., from composition material panels, wherein the basic material may be a chip-board or hardboard material, sprayed with the fire-proofing materials or mixtures. However, this type of production is rather expensive. The same also applies to panels or slabs made of concrete, gypsum or the like if these are to be fire-proofed.

According to this invention, heat resistance and particularly fire resistance of such building panels is substantially improved if the above described refractory material is used in a basic mixture for building panels, particularly concrete slabs or panels and chipboard panels.

Advantageously such a panel may consist of a flameproof fabric of plastic or wire reinforced with a sealing layer of paper or thin plastic foil and a layering on one or both sides thereof of the above-mentioned refractory material. This provides considerable simplification in the manufacture of building panels because, e.g., the wire mesh, which is reinforcingly sealed, may be drawn continuously off a roll to be subsequently rolled, sprayed or tamped on one or both sides thereof with the refractory material. Again, the composition of the mixture may be varied to suit mechanical and thermal demands.

It is also possible to construct a building panel, and especially a fire-proof and sound-inhibiting panel or mat in such a way that it comprises an inner core of compressed mineral and/or glass wool and an adhesive and protective layer of the filler material according to this invention, a granulate or powder of stone material and a binding agent. Such a panel, which may also be flexible, can be cut to any required size on the building site. The layering or coating, which is also elastic, and which has varnish-like properties, may preferably be provided with admixtures or finest gravel, marble or quartz particles, or dyed dolomite. Such a panel or mat will show high flexibility and provide adequate fire and sound protection.

Advantageously the filler material according to this invention may also be added to protective coatings for refractory bricks. Hitherto refractory bricks have been provided with insulating coatings or water-repellent coverings, such as coatings of paraffin, plastic or the like, which serve the purpose of keeping the bricks dry until they have been fitted in the walls of a firebox or sintered. However, such insulating coatings are not very suitable because they tend to melt when the stones are fitted in a firebox or like piece of masonry and, if they melt before sintering, they will necessarily leave gaps which may cause premature destruction or dropping out of the bricks. Moreover, these insulating layers provide only limited protection for the bricks against moisture absorption so that the bricks may tend to disintegrate from moisture absorption after a relatively short period of time.

In order to minimize moisture absorption between the manufacture of the bricks and their fitting, and at the same time ensure proper sintering for the fitted refractory brickwork, the invention also proposes a protective coating for refractory bricks which comprises an organic binding agent, filler material according to the invention and (optionally) the basic material used in the making of the refractory bricks. The protective coating preferably has a lower melting point than the bricks, and thus favourably affects the sintering process and ensures, in the fusion phase, a flux-transition between the material components of the bricks and the material therebetween. In the final result this will produce a hygroscopically meritorious protection layer with sinter-transformation.

In a method of applying the protective coating, the basic mixture for the brick is poured into a mould, and, if desired, pressed and tempered, and the basic material, and/or the brick, prior to and/or after pressing, is/are sprayed with the protective coating. It is possible to introduce the protective coating into the mould in the form of a sprayable or poured mass first and then to add the basic material for the brick to the mould. Alternatively, or in combination, the brick may be spray-treated with the protective coating before tempering.

The filler material according to this invention is also suitable for making fire-proof concrete which is particularly in demand for high-rise buildings. For achieving economical production without loss of strength in the concrete, filler material according to the invention may be admixed with the concrete. By an appropriate addition of the filler material to the concrete it is impossible to attain fire-protection safety factors, for example, of Class F 90, Class F 120 or even Class F 240. The amount of filler material in the concrete may be between 5 and 50%. The concrete may also contain further heat-resistant additives, including mineral wool. If the concrete is intended for exposure to very high temperatures, Portland cement is less suitable as hydraulic binding agent. The special binding agents which have so far been commonly employed for the manufacture of fireproof concrete, such as aluminum phosphate, aluminum sulphate and refractory clay, may be dispensed with. Experiments have shown that the concrete according to this invention may withstand a temperature of approximately 1200° C. for several hours.

Another field of application for the filler material according to this invention is foundry technology. In foundries it is frequently the custom to make shell moulds and cores from sand mixtures enveloped by phenolic resins. This practice, however, results in the generation of environmentally harmful vapours during casting, which contain, for example, phenol, formaldehyde, ammonia and other pollutants. These vapours must be extracted and cleaned by expensive processing methods.

This can be avoided by using, according to this invention, a refractory moulding sand which consists of a mixture of a fine quartz-bearing sand and the filler material of this invention. The mixture proportions are selected in accordance with the size of the moulds, and cores. When proceeding in this manner, it is possible to use binding agents which do not give off any environmentally harmful or polluting gases and vapours, such as, for example, cement.

Another field of application for the filler material according to this invention is their incorporation in high temperature resistant and abrasion resistant emery mixtures. It is common knowledge to admix emery pastes with a fine quartz-containing powder to impart resistance to high temperatures and abrasion to the resulting mixture. A substantial improvement can be obtained with regard to high temperature and abrasion resistance with an emery paste incorporating the filler material according to this invention. Such an emery paste has high temperature resistance values corresponding approximately to 2,000° C. Temperature resistance can be adjusted to any desired value between 1000° C. and 2000° C. by a suitable choice of mixture proportions. Mixed with corundum and similiar materials the emery paste according to this invention may be used for high-quality technical purposes, with relatively low expense.

Furthermore, the filler material according to this invention may also be used with advantage for improving the insulating properties of electrical apparatus, particularly switch boxes, fuse boxes and the like, if admixed with the material used for making such apparatus and fittings.

One important problem in plastic technology resides in making plastic materials heat resistant at an acceptable price. Many of the plastic materials which are in general use become unstable at 80° to 120° C., that is to say they are subject to structural alteration and are no longer stable. In addition, many plastic materials have poor erosion resistance, particularly at high temperatures.

For improving the heat stability and/or mechanical abrasion strength of plastic materials, it is proposed to admix with the plastic product, either in the basic mixture or in a further process phase, the filler material according to this invention so as to produce an article moulded from plastic material and incorporating this filler material. Such a plastic material may be heat stable up to 200° C., and over, and may in addition have substantially improved mechanical abrasion resistance and resistance to erosion. The amount of filler added to the plastic material will be selected in accordance with prevailing requirements and may be up to 50% of the total weight.

In addition, the filler material according to this invention is also capable of improving the properties of expanded or foamed plastic material. A polyurethane foam, comprising from 10 to 50% of filler material according to this invention, has a very high degree of flame-resistance and is self-extinguishing. These results cannot be achieved by an addition of crystalline $SiO_2$.

Another important field of application for the filler material according to this invention is to be found in the manufacture of paints, particularly for protective insulating coatings of building parts. For achieving resistance to abrasion and corrosion as well as for fire protection and oil-resistance, it is customary to employ varnish or colour paints which are manufactured from various basic substances. In general, these paints contain organic compounds, such as phenolic resins, polyurethane and the like. However, such paints are not wholly satisfactory with regard to their actual resistance to abrasion, corrosion, fire and oil.

These special properties in paint mixes of the kind mentioned, particularly as resistant and insulating protective coatings of building parts, can be substantially improved if the paint is admixed with filler material in accordance with the present invention. Not only will this improve the stability and resistance of the paint but it will also open up wider fields of application for paints of this kind. Their resistance to fire and abrasion may be substantially increased as compared with comparable rubber or plastic compounds. For example, with a paint composition according to this invention it is possible to achieve resistance and stability to temperatures far in excess of 500° C. Moreover, the paint composition according to this invention can be produced at a substantially lower price, which may be up to 80% below that of comparable paint compositions. Depending on prevailing requirements, the filler material proportion contained in the mixture may be up to 50%.

In the case of varnishes, in particular synthetic resin varnishes, it is well-known that the properties may be improved by additions of boryl phosphate and/or boron nitride and/or urea. It is also possible to add metal oxides. A further considerable improvement with regard to heat resistance as well as the mechanical properties, in particular abrasion strength, is obtained by an addition of up to 50% of filler material according to this invention.

For making the varnish not only flame and heat resistant but also treating it at the same time against barnacle adhesion, e.g., for the shipbuilding trade, the invention proposes to treat this varnish with residues from coffee extraction, that is to say the so-called "coffee wax or resin".

The erosion resistance of the varnish may be further improved by adding to the varnish, in addition to the filler material of this invention, the metal-oxide-bearing dusts which occur in dust form in the production of steel.

Finally, the filler material according to this invention may also be used with advantage for sound or noise insulation purposes, particularly as applied to motor vehicle parts, machinery, apparatus and the like, which produce a resonance action and to which coatings of paint mixtures or porous liner materials are given. As far as the paint mixes are concerned, which are frequently bitumen-based, the desired noise insulation is obtained by an addition of softeners (emollients) and appropriate fillers. Both the emollients and the fillers in general consist of organic substances and are combustible. Under extreme temperature conditions the paint coatings may also become detached from the vehicle parts because the basic material as well as the emollient will either become brittle or melt.

In order to remedy these drawbacks the invention proposes a fire-proof and/or corrosion-resistant sound absorbing material which includes filler material according to this invention. Such a sound-proofing material obtains its desired characteristics from the large surface area of the filler material and its amorphous structure, and in addition has a high temperature resistance. It was ascertained that, for example, a mixture of bitumen and the filler material according to this invention (without addition of emollients) provided the identical sound-proofing effect as conventional sound-inhibiting paint coatings. A further advantage resided in the factor that the adhesion of the paint composition was greatly enhanced by the filler material so that the material according to this invention was excellently suited for sound-proofing and also, e.g., as an underseal for motor cars and/or wheel arches which are subject to corrosion from water and/or salt on the roads, and where this material ensured much longer service. The filler material may amount up to 50% of the total weight of the mixture.

The filler material may further be employed with great advantage in making refractory and high temperature resistant-linings for industrial furnaces and for the metallurgical industries. Conventional tamping masses may receive admixtures of filler material according to the invention by up to approximately 35, and conventional spray masses up to about approximately 50%. These masses show a low degree of potential shrinkage and a low starting point for sinter reaction, but a high degree of fire resistance, strong adhesion to their background, high surface hardness and good elasticity. For example, a mass or material mixture comprising 30% refractory clay (grain size 80% between 0 and 0.5 mm), 30% sand (0 to 0.5 mm), 10% alumina flux cement and 30% of the filler material, to which 20% by weight of water is added, is extremely suitable for spray application in repair work to the interior lining of coke ovens. In coke ovens, owing to the high temperature gradient of approximately 800° C. in the vicinity of the door up to about 1,200° C. in the middle of the firing chamber, it has hitherto been necessary to employ several differently-constituted repair mixtures which were adapted to these different temperature zones. However, the above specified mixture or composition could be successfully used in every region of the coke oven walls. After the mixture has been sprayed on, it may provide a substantially completely fissure-free coating which adheres firmly to the wall and shows very good mechanical strength and durability.

A special advantage arises from the fact that, when the filler material according to this invention is used in refractory and high-temperature resistant materials, it is no longer necessary to add alkalies. Previously, conventional refractory and high-temperature-resistant masses have required an addition of alkalies, i.e., sodium silicate, to ensure adequate adhesion of the mass to the refractory bricks. However, this means that one has to accept a lower mollification point and damage to the bricks.

Coke oven doors are conventionally repaired with tamping masses. Such a tamping mass may, by the use of this invention, comprise 15% sand (0–0.5 mm), 50% chamotte B (0–4 mm), 15% alumina cement and 20% of filler material according to this invention. Such a tamping mass has a temperature resistance of 1,100° C.

Similarly, a tamping mass suitable for use in foundries comprises 55% sand (granulation 0.4 mm), 5% chamotte A, 7% Portland cement 450 and 22% of filler material according to this invention. This tamping mass has temperature resistance up to 1,550° C.

In all of the above mentioned cases, where control tests were carried out using extremely finely-ground crystalline silicon dioxide, it was found impossible to obtain good results similar to those achieved when using the filler material (of this invention) which contains silicon dioxide in amorphous form.

What we claim is:

1. In a heat- or fire-resistant refractory composition compatible with silicon dioxide and containing binder in admixture with at least one other ingredient, the improvement wherein the composition is sprayable or tampable and is suitable for coating steel girders or for lining an industrial furnace or metallurgical vessel, the binder is other than sodium silicate and the composition further comprises a heat-, flame- or fire-resistance increasing amount of dust-like silicon dioxide having a bulk weight within the approximate range of from 0.25 to 0.5 gram per milliliter, 95 percent of which has a grain size below 50 microns, approximately 82 to 95 percent of which is amorphous silicon dioxide and approximately 5 to 18 percent of which is crystalline quartz, the dust-like silicon dioxide comprising up to 50 percent of the composition.

2. A refractory composition according to claim 1 wherein the dust-like silicon dioxide is predominantly-amorphous silicon-dioxide-dust-emission product of electro-thermic ferro-silicon or silicon manufacture.

3. A refractory composition according to claim 2 for use in industrial furnaces and metallurgical vessels and comprising sand and cement in addition to the dust-like silicon dioxide.

4. A sprayable composition according to claim 3 which comprises 30 percent chamotte, 30 percent sand, 10 percent alumina cement and 30 percent of the predominantly-amorphous, dust-like silicon dioxide.

5. A tampable composition according to claim 3 comprising 15 percent sand, 50 percent chamotte B, 15 percent alumina cement and 20 percent of the predominantly-amorphous, dust-like silicon dioxide.

6. A tampable composition according to claim 3 comprising 66 percent sand, 5 percent chamotte A, 7 percent Portland cement 450 and 22 percent of the predominantly-amorphous, dust-like silicon dioxide.

7. A refractory composition according to claim 2 comprising from 5 to 50 percent by weight of the dust-like silicon dioxide.

8. A refractory composition according to claim 7 having about 20 percent by weight of the dust-like silicon dioxide.

9. A refractory composition according to claim 7 having about 30 percent by weight of the dust-like silicon dioxide.

* * * * *